United States Patent
Madan et al.

(10) Patent No.: US 12,153,547 B2
(45) Date of Patent: Nov. 26, 2024

(54) METHOD TO SUPPORT TEMPORARY NAMESPACE IN A DEDUPLICATION FILESYSTEM

(71) Applicant: Dell Products L.P., Round Rock, TX (US)

(72) Inventors: Nitin Madan, Cupertino, CA (US); Neerajkumar N. Chourasia, San Ramon, CA (US)

(73) Assignee: Dell Products L.P., Round Rock, TX (US)

( * ) Notice: Subject to any disclaimer, the term of this patent is extended or adjusted under 35 U.S.C. 154(b) by 84 days.

(21) Appl. No.: 17/660,330

(22) Filed: Apr. 22, 2022

(65) Prior Publication Data
US 2023/0342334 A1 Oct. 26, 2023

(51) Int. Cl.
*G06F 16/174* (2019.01)
(52) U.S. Cl.
CPC .............................. *G06F 16/1748* (2019.01)
(58) Field of Classification Search
CPC .................................................. G06F 16/1748
See application file for complete search history.

(56) References Cited

U.S. PATENT DOCUMENTS

| | | | |
|---|---|---|---|
| 7,734,951 B1* | 6/2010 | Balasubramanian | ........................ G06F 11/1435 714/6.13 |
| 8,650,228 B2* | 2/2014 | Wideman | ............ G06F 16/1727 711/E12.001 |
| 10,489,301 B1* | 11/2019 | Visvanathan | ....... G06F 12/0868 |
| 2019/0068641 A1* | 2/2019 | Araujo | .................. G06F 21/566 |
| 2021/0271561 A1* | 9/2021 | Mathew | .............. G06F 9/30047 |

FOREIGN PATENT DOCUMENTS

| | | | | | |
|---|---|---|---|---|---|
| CN | 106250270 B | * | 5/2019 | .......... | G06F 11/1435 |
| JP | H06110742 A | * | 4/1994 | | |

* cited by examiner

*Primary Examiner* — Hosain T Alam
*Assistant Examiner* — Anthony G Gemignani
(74) *Attorney, Agent, or Firm* — Workman Nydegger

(57) ABSTRACT

One example method includes creating a namespace of a deduplication filesystem, adding a 'temporary' flag to the namespace, adding a 'delete' flag to the namespace when the namespace is to be deleted, and when a maximum number of namespaces permitted by the deduplication filesystem has been reached due to the creating of the namespace, deleting another namespace bearing a 'temporary' flag and a 'delete' flag. In this way, efficient use may be made of the NVRAM, while also maintaining compliance with deduplication filesystem requirements concerning the maximum number of permitted namespaces.

18 Claims, 4 Drawing Sheets

METHOD TO SUPPORT TEMPORARY NAMESPACE IN A DEDUPLICATION FILESYSTEM

FIELD OF THE INVENTION

Embodiments of the present invention generally relate to the use of namespaces in deduplication filesystems. More particularly, at least some embodiments of the invention relate to systems, hardware, software, computer-readable media, and methods for the implementation of temporary namespaces in deduplication filesystems, which may in turn promote more efficient use of NVRAM.

BACKGROUND

Deduplication filesystems typically employ NVRAM for the stabilization of changes to namespaces. However, NVRAM is expensive and as a result, typical systems do not employ a large amount of NVRAM. Due to the relative scarcity of NVRAM, there is an incentive to make efficient use of it. Notwithstanding, typical deduplication filesystems use namespace schemes and methods that may tax the ability of the NVRAM to support deduplication filesystem operations.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
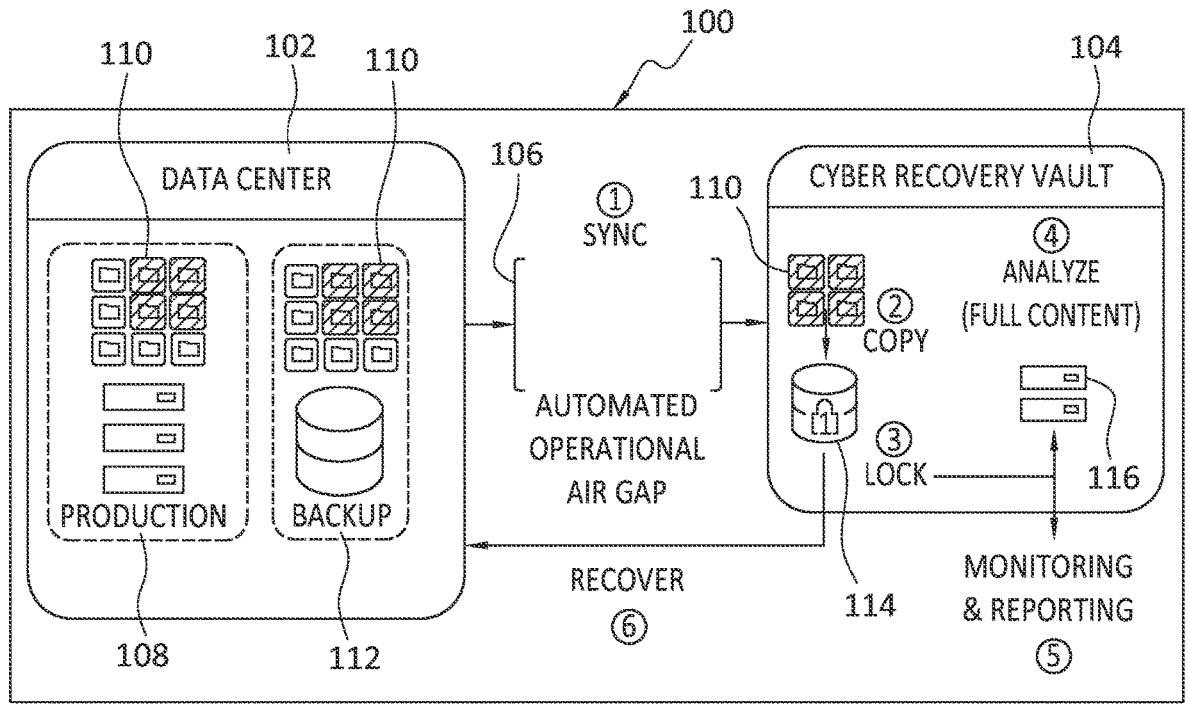
FIG. 1 discloses aspects of an example system architecture, according to some embodiments.

Embodiments of the present invention generally relate to the use of namespaces in deduplication filesystems. More particularly, at least some embodiments of the invention relate to systems, hardware, software, computer-readable media, and methods for the implementation of temporary namespaces in deduplication filesystems, which may in turn promote more efficient use of NVRAM (non-volatile random access memory).

In general, example embodiments of the invention are directed to methods for namespace delete functionality, which may operate to clean up an Mtree handle from a U-tree data structure, thereby reducing the limitations of the Mtree counts, associated with temporary namespaces. In this way, NVRAM space may be more efficiently used, at least in relation to conventional approaches to the use and stabilization of namespaces in deduplication filesystems.

In more detail, example embodiments may define and implement a temporary namespace for a deduplication filesystem. This namespace may configured and employed such that it may not be able to be un-deleted once it has been deleted. Advantageously, this temporary namespace may not count against the number of active namespaces stored in NVRAM and, thus, the temporary namespace may not be limiting of the number of data protection policies that can be associated in the data deduplication system. Various examples of specific schemes for the use of a temporary namespaces are disclosed elsewhere herein.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment of the invention may enable more efficient use of NVRAM, particularly as that use relates to the storage in NVRAM of deduplication filesystem namespaces. Various other advantages of example embodiments of the invention will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. OVERVIEW

Data protection platforms, such as the Dell EMC PowerProtect (PP) Cyber Recovery platform for example, serve to protect and isolate important data from ransomware and other threats. More particularly, and with reference to the illustrative example of the Cyber Recovery platform, that platform operates to copy out the replicated namespace into a vault namespace, or Mtree, as a PIT (Point in Time) copy. This PIT copy may then be copied out to a so-called sandbox namespace. The sandbox namespace may be scanned using a ML (Machine Learning) algorithm. If no ransomware or corruption is detected during the scan, the sandbox namespace may then be deleted.

Continuing with the Cyber Recovery example, the Dell EMC PowerProtect DataDomain (PPDD) storage platform may export namespaces as Mtrees (Managed Trees). As an optimization, the Mtree delete operation may involve simply tagging the Mtree as deleted. The Mtrees and the space they occupy may be cleaned up by an explicit garbage collection (GC) process that may be scheduled on a regular basis, such as weekly. As a result, for every Mtree stored in a backup environment, such as an air-gapped vault for example, there may be up to seven stale Mtrees, one for each day of the example weekly GC cycle, which are consumed and waiting to be cleaned up by the GC operation.

The maximum number of Mtrees on the PPDD appliance are limited by the available NVRAM on the PPDD appliance. For example, the number of Mtrees may be capped at 128, or 256, namespaces, depending on the available NVRAM. The additional count of up to seven Mtrees, noted in the example above, may limit the number of vault Mtrees that can be supported, particularly given that there may be one vault Mtree for each different data protection policy. Thus, some example embodiments are directed to systems and methods that may operate to clean up the stale namespaces efficiently so as to enable many more data protection policies to be stored on a given appliance.

B. ASPECTS OF SOME EXAMPLE OPERATING ENVIRONMENTS

B.1 Operating Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC PowerProtect DataDomain (PPDD) storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, details are provided concerning aspects of an example operating environment 100 in which example embodiments may be employed. In the illustrative, and non-limiting, example of FIG. 1, a data center 102 is configured for communication with a vault 104 to which data from the data center 102 can be backed up. The vault 104, which may take the form of a Dell Cyber Recovery vault for example, may be isolated from the data center 102, except under specified conditions, by a physical air gap 106. In general, the nature of the air gap 106 is such that when the air gap 106 is in place, there is no physical or other connection between the vault 104 and the data center 102, thus ensuring the security and integrity of any data stored in the vault 104. Security procedures may be implemented that provide for selective closing of the air gap 106, for a limited time, so that the data center 102 and the vault 104 can communicate with each other. In at least some instances, the vault 104 may control the opening and closing of the air gap 106.

The data center 102 may include a production system 108 in which data 110 is generated. Some or all of the data 110 may be backed up to, or at least accessible by way of, a namespace in a backup environment 112 of the data center 102. Some or all of the data 110 in the namespace of the backup environment 112 may be replicated to the vault 104. Particularly, the vault 104 may include, or provide, a namespace 114 configured to receive a PIT (point in time) copy of the namespace that was replicated from the backup environment 112. Finally, the vault 104 may comprise a further namespace 116, which may be referred to herein simply as a 'sandbox' or 'sandbox namespace.'

Various operations may be performed in the operating environment 100, as described hereafter. The data 110 journey may begin when it is created or modified in the production system 108 and then backed up to a namespace in the backup environment 112. A subset of the data 110, such as a group of files, in the backup environment 112 may then be replicated over (1) to the vault 104. In general, the vault 104 may serve as another backup environment, and may be air gapped, as described earlier herein. After the data 110 has landed in the vault 104 namespace, a Point In Time (PIT) copy of that namespace is copied over (2) to another namespace in the vault 104, and the copy then retention locked (3). At this stage, the infrastructure, that is the vault 104, guarantees immutability of the data stream. Next, this locked copy of the data 110 may be copied into another namespace, or sandbox. The data in the sandbox may be subjected (4) to an analyze routine, and that data and/or sandbox may also be subjected to monitoring and reporting (5), for example to determine, and report on, an outcome of the analysis (4). The analyze routine may comprise a ML algorithm which scans the data 110 in the sandbox for malware, such as ransomware for example. If any malware is detected, that is reported. If the scan does not reveal any problems, then the sandbox, that is, the namespace to which the locked data was copied, is marked as 'deleted' once the process is complete. At some point thereafter, the data in the vault 104 may be recovered (6) to the data center 110.

B.2 Namespaces

In general, a namespace may comprise a structure that enables the lookup of particular data, such as a file for example. Thus, a namespace, in some configurations, may comprise a structure having elements that each list, or correspond in some way to, a filename. The namespace may, or may not, contain the actual data of the files, or other data, whose filenames are held in the namespace, and may include pointers or other elements that enable a query to quickly locate and return requested data.

Note that as used herein, an Mtree refers to a filesystem namespace that is implemented in the form of a Btree that may comprise a file that is stored on disk. The Mtree may be presented to a user or a system. Changes to the Btree may, as discussed below, be stabilized to memory, such as NVRAM for example.

Figure 2:
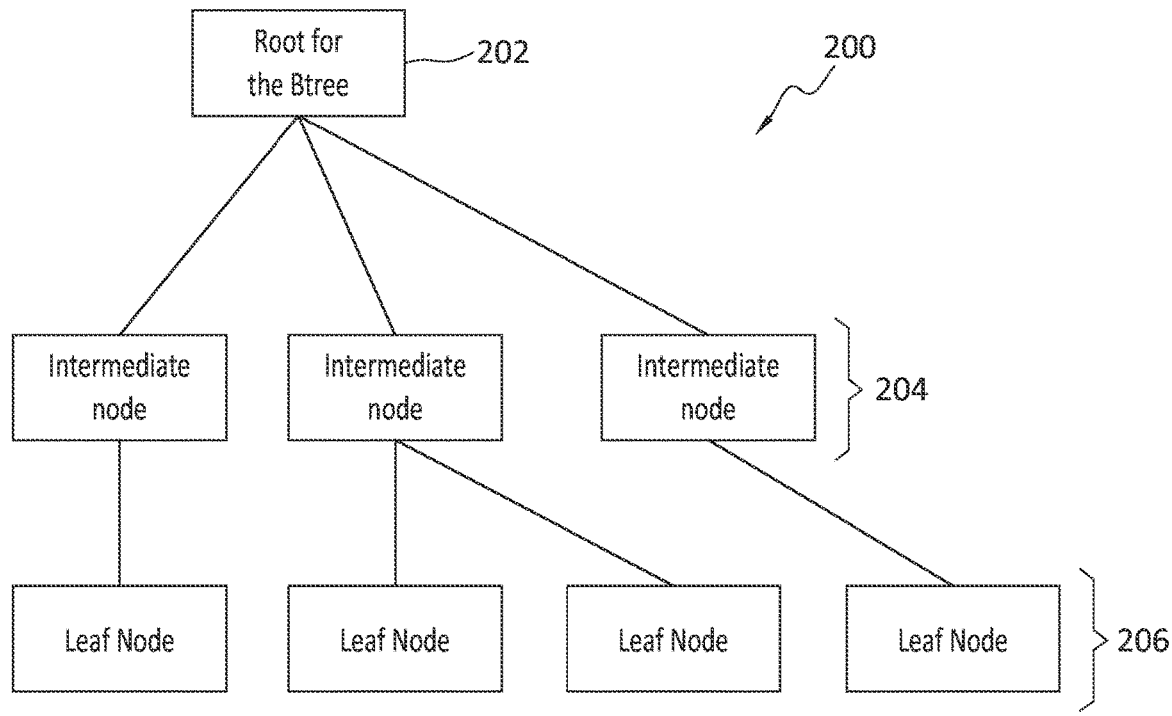
FIG. 2 discloses aspects of an example Btree data structure, according to some embodiments.

To illustrate, the Dell PowerProtect DataDomain (PPDD) platform is an example of an inline deduplication enabled filesystem. The namespace by itself may be represented as a Btree (self-balancing search tree) file, which is written down as segments. PPDD supports multiple namespaces (referred to as 'Mtrees' in the specific context of a PPDD implementation). An example Btree 200 is disclosed in FIG. 2. As shown, the Btree 200 may include a root node 202, intermediate nodes 204, and leaf nodes 206.

Figure 3:
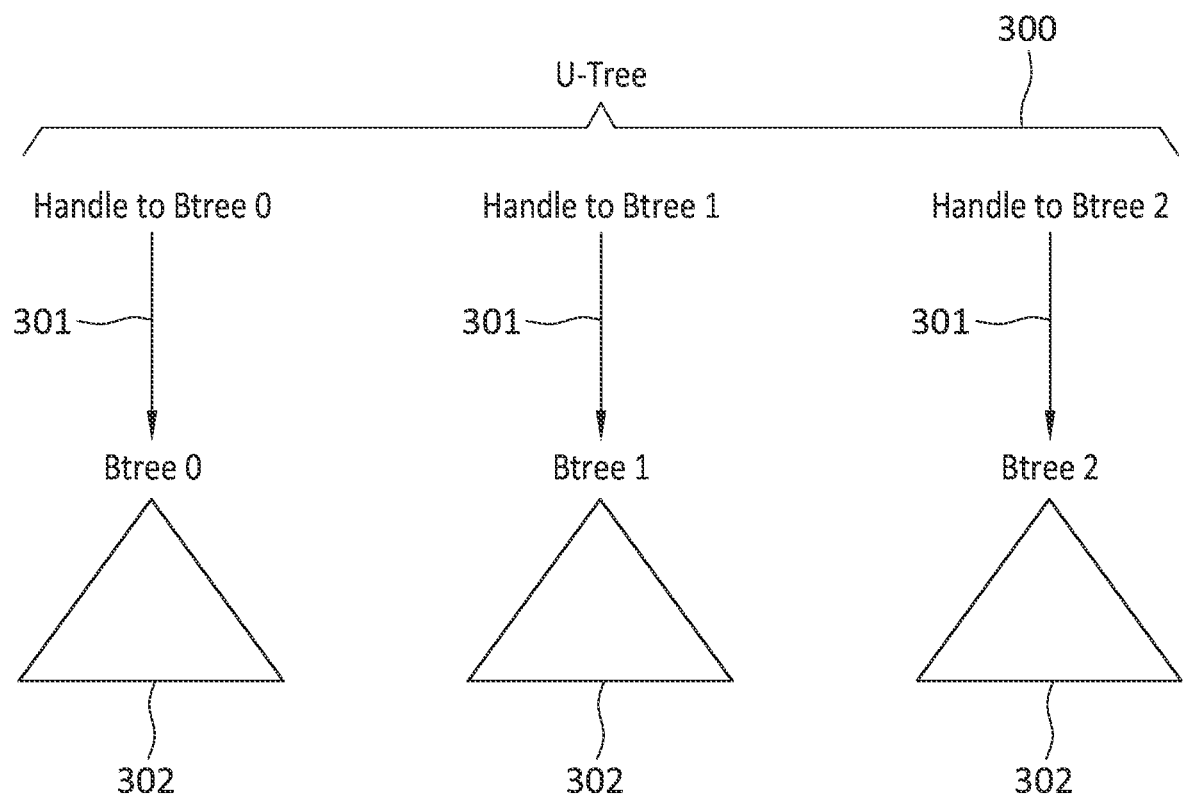
FIG. 3 discloses aspects of an example U-tree data structure, according to some embodiments.

With reference now to FIG. 3, an umbrella tree 300, or U-tree, may be defined that includes respective handles 301 for each of a group of Btrees 302, such as the Btree 200 for example, together. Thus, to access any file of a namespace, the filesystem must enter the U-tree 300, proceed to the correct Btree 302, and then to the correct Btree leaf (see reference 206 in FIG. 2), to access the attributes of the file, which attributes may include the content of the file, of interest.

In general, the namespace updates may be stabilized on NVRAM. By way of explanation, a Btree, or Btree file, represents a namespace. As there are changes made to files represented in the namespace, for example as new files are created, other files modified, or removed, the changes to the namespace need to be persisted to disk. Flushing down changes to disk for every file change is expensive, and inefficient. Thus, NVRAM may be used to stage a group of changes to the namespace. In this approach, the changes are committed to the NVRAM, and then flushed periodically, rather than a flush being performed each time a change occurs to the namespace. This is process may be referred to as stabilizing the writes on the NVRAM device. Because there may be multiple namespaces in a particular environment, it may be the case that multiple sets of writes, a respective set for each namespace, may be stabilized on NVRAM.

As noted earlier, example namespace updates may include the addition, or deletion, of a file, or any other operation(s) which may affect the structure and/or content of the namespace. Because the NVRAM is a limited resource, the number of available namespace changes that can be staged in the NVRAM is limited and, therefore, the number of namespaces that can exist in the system at any one time may be limited accordingly. The limited number of available namespaces, which is a function of NVRAM availability for the staging of changes to the namespaces, may, in turn, reduce the speed and effectiveness of data deduplication and/or data replication operations and data storage operations.

In some circumstances, an inline deduplication enabled filesystem, an example of which is the PPDD platform, may serve as a backup target and, in a typical use case, that filesystem may be the storage of last resort. A namespace may host the files, which are typically backup files. One aspect of some deduplication filesystems, such as PPDD for example, is that a namespace which has been marked as deleted, can be un-deleted. The purpose of this functionality is to prevent inadvertent data loss, where an administrator accidentally deletes a namespace.

In such filesystems, the un-delete functionality for a namespace is possible because the data segments corresponding to the namespace, that is, to the Btree file, and the corresponding files are not really cleaned up, that is, deleted, until the GC process runs. Thus, the data segments may be marked or designated as 'deleted,' but will actually remain on disk until they are removed by a subsequent iteration of the GC process.

To achieve this un-delete functionality, the Mtree delete function adds a 'deleted' flag on the Mtree handle or, more generally, the Btree handle in the U-tree 300. This Btree handle is not removed from the U-tree 300 data structure. When an un-delete operation is executed, the 'deleted' flag is removed. This implies however that the Mtree which was flagged as deleted, and whose 'deleted' flag has now been removed, thus also counts against the total number of available Mtrees. As noted earlier, and with reference to the example of PPDD, there is a limited number of Mtrees available on the system, due to NVRAM constraints. In some instances, retaining the deleted namespace may not be a problem, because the number of customer provisioned namespaces may be relatively small. In other cases however, and the Cyber Recovery example is illustrative, problems may arise. For example, systems that employ a temporary namespace, or 'sandbox,' may run afoul of 'un-delete' functions and requirements.

B.3 Namespace Delete Functionality

In light of the example problems and circumstances disclosed herein, embodiments of the invention are directed to various methods of implementing a namespace delete functionality, one feature of which may be the conservation of NVRAM. In general, the example approaches to the namespace delete functionality may operate to clean up a Btree handle from a U-tree data structure, thereby reducing the overall Btree count in the system which may, in turn, help to make more efficient use of available NVRAM. This may be accomplished through the implementation and use of a 'temporary' namespace for the deduplication filesystem. Such a namespace may not be able to be 'un-deleted' once it has been deleted. The temporary namespace may have the advantage that it does not count against the number of active Btrees, and therefore, may not play a role in limiting the number of customer data protection policies that can be implemented in the data deduplication system, and stored on a given appliance. Following are some example approaches for the implementation and use of a 'temporary' namespace, such as a 'sandbox' for example, that may be employed in a deduplication filesystem.

B.3.1 Tagging a Btree at Create Time

While creating a namespace, such as a 'sandbox' namespace that is not able to be un-deleted once it has been deleted, some embodiments may tag the namespace with a special tag, which identifies the namespace as 'temporary.' The 'temporary' flag may signal the deduplication filesystem that when the 'temporary' namespace is deleted, the deduplication filesystem should (1) remove the Btree handle, for the 'temporary' namespace, from the U-tree data structure and (2) reduce the number of the active Btrees in the deduplication filesystem by one, thus freeing space in the NVRAM for changes to another Btree. This temporary namespace may comprise an Mtree that is implemented using a Btree data structure.

B.3.2 Force Delete (of Namespace)

Another approach to implementation of a temporary namespace functionality would be to pass a special instruction—to permanently delete a given namespace—to the namespace 'delete' command. In this approach, the user may be given an option to pass a 'force' flag to the Btree delete command. This delete command, when executed, would delete the Btree handle from the U-tree data structure, with the result that the Btree associated with that Btree handle will be deleted. This will reduce the total count of Btrees on the deduplication filesystem by one, thus freeing space in the NVRAM for filesystem changes that may be associated with an additional Btree.

B.3.2 Hybrid—Reap Temporary Namespaces (Btree(s))

An alternative approach to implementation of a temporary namespace functionality may have a hybrid nature, where the namespace has the feature of being undelete-able, but still reduces the current Btree count. In this method, the temporary namespaces may be tagged as 'temporary' at create time. As well, a 'temporary' Btree that is to be deleted may also be tagged with the 'delete' flag. Thus, a 'temporary' namespace in the hybrid approach according to some example embodiments may have both the 'temporary' and 'delete' (or 'deleted') flags. In conventional approaches, even though a Btree is deleted, the Btree is still counted as an active Btree, and so limits the NVRAM space that is available for one or more additional Btrees. Absent the hybrid approach implemented by some embodiments of the invention, if the Btree count is equal to the max Btrees for the system, then no new Btrees can be created, or stored.

Example implementations of the hybrid approach may operate to reap the oldest Btree that has both a 'temporary' flag and a 'deleted' flag, to create a slot for the new Btree. In this way, the 'deleted' Btrees that also have the 'temporary' flag may enjoy the status of being undeletable, or at least not deleted yet, but do not add to the count of Btrees in the system. This hybrid approach is explained in further detail below.

Consider, for example, a system in which the maximum number of Btrees is 4. Let these be designated 'vault,' 'temporary-Btree1,' 'temporary-Btree2,' and 'temporary-Btree3.' If a user were to try to create another Btree at this time, the Btree creation would fail since the maximum number of Btrees in the system has already been reached. Further, absent the hybrid approach, the Btree creation would still fail, even if the 'temporary' Btrees were to be tagged as deleted. Thus, in this illustrative example according to some embodiments, the temporary Btrees may be tagged as 'temporary,' so the Btree list according to this example embodiment may appear as follows:

| Id | Mtree Name | Flags |
|---|---|---|
| 1 | Vault | active |
| 2 | Temporary-mtree1 | <deleted><temporary> |
| 3 | Temporary-mtree2 | <deleted><temporary> |
| 4 | Temporary-mtree3 | <deleted><temporary> |

Now, on the next Btree 'create' command, the oldest of the 'temporary' tagged Btrees, 'Temporary-mtree1' in this example, may be deleted, and its place may be taken by a new Btree. In this way, the hybrid approach according to example embodiments may respect the system requirements for the maximum permissible number of Btrees, while the 'temporary' tagged Btrees will avoid deletion because although they have been flagged as 'deleted,' their respective handles have not yet been removed from the U-tree structure. That is, the 'deleted' Btrees are not actually deleted until their handles have been removed from the U-tree structure. Finally, on a GC run, the Btrees which have been tagged as 'deleted' may be cleaned up, that is, actually deleted.

Note that the 'temporary' Btree that is deleted need not be the oldest Btree, and other criteria may be used to determine which Btree will be deleted. For example, the largest Btree may be deleted, or a Btree associated with a particular customer may be deleted. Any other criterion, or criteria, may be used to determine which Btree will be deleted.

D. EXAMPLE METHODS

Figure 4:
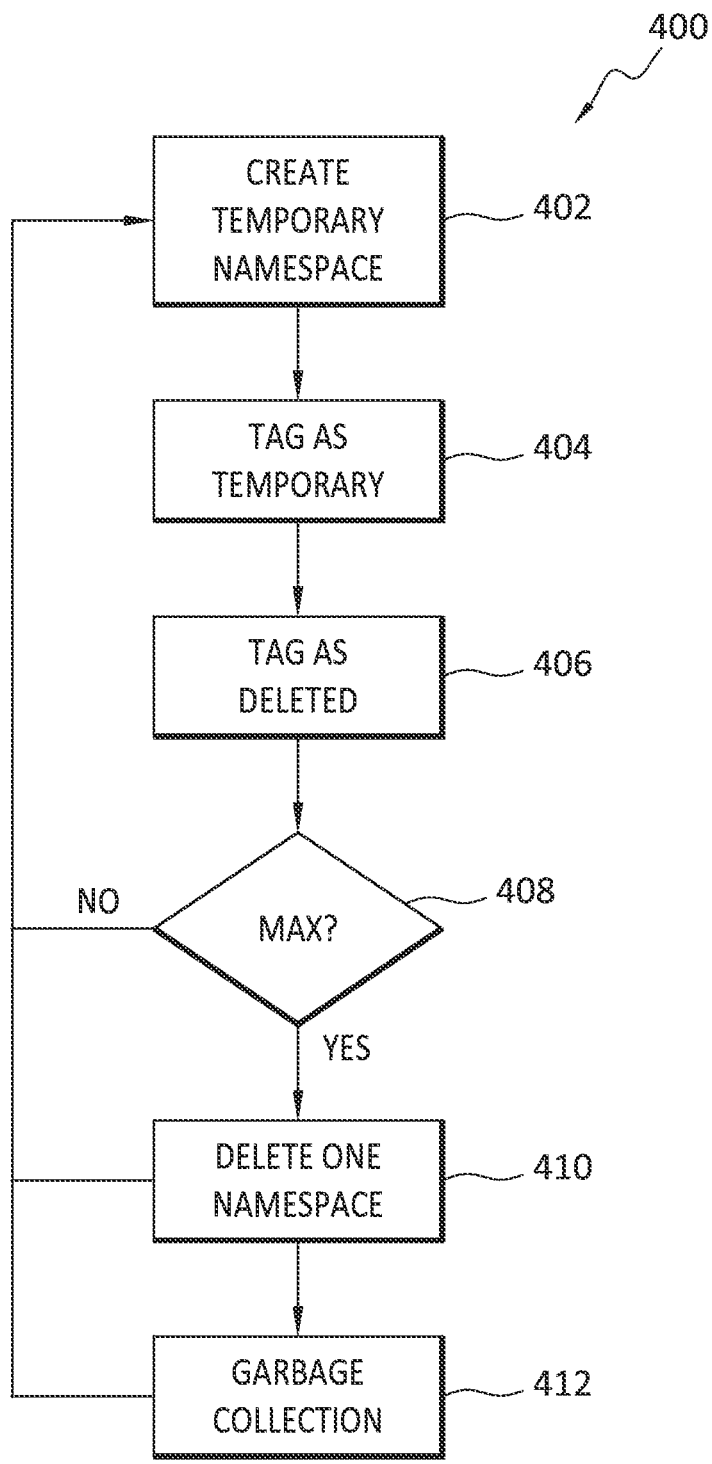
FIG. 4 discloses aspects of an example method according to some embodiments.

It is noted with respect to the disclosed methods, including the example method of FIG. 4, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 4, an example method 400 according to some embodiments is disclosed. The method 400 may begin when a temporary namespace, such as a 'sandbox' for example, is created 402. The temporary namespace may be assigned a 'temporary' flag 404, and a 'deleted' flag 406.

A check 408 may then be performed to determine if the maximum number of namespaces in the system has been reached. If not, the method 400 may return to 402 for the creation of one or more additional temporary namespaces. On the other hand, if the check 408 reveals that the maximum number of namespaces permitted by the system has been reached, one of the 'temporary' namespaces may be deleted 410, according to various criteria. The process 410 may include removal of the handle of that 'temporary' namespace from a U-tree structure. Any remaining 'temporary' namespaces may be deleted during the next iteration of a garbage collection process 412.

In an alternative approach to the method 400, a new namespace may be created and assigned a 'temporary' flag. The 'temporary' flag may indicate to the system that when the namespace is deleted, its handle should be removed from the U-tree. Correspondingly, the number of active namespaces in the system may be decremented by one.

In another alternative approach to the method 400, a user may have the option to pass a 'force' flag to the Btree delete command, so that execution of the command would delete the Btree handle from the U-tree data structure. Correspondingly, the number of active namespaces in the system may be decremented by one.

E. FURTHER EXAMPLE EMBODIMENTS

Following are some further example embodiments of the invention. These are presented only by way of example and are not intended to limit the scope of the invention in any way.

Embodiment 1

A method, comprising: creating a namespace of a deduplication filesystem; adding a 'temporary' flag to the namespace; adding a 'delete' flag to the namespace when the namespace is to be deleted; and when a maximum number of namespaces permitted by the deduplication filesystem has been reached due to the creating of the namespace, deleting another namespace bearing a 'temporary' flag and a 'delete' flag.

Embodiment 2

The method as recited in embodiment 1, wherein the maximum number of namespaces is a function of a size of an NVRAM that stabilizes namespace changes.

Embodiment 3

The method as recited in any of embodiments 1-2, wherein the namespace corresponds to a data protection policy of a customer.

Embodiment 4

The method as recited in any of embodiments 1-3, wherein deleting the another namespace comprises deleting a handle of the another namespace from a U-tree data structure that comprises the another namespace.

Embodiment 5

The method as recited in embodiment 4, wherein the another namespace is not actually deleted from the deduplication filesystem until the handle has been deleted.

Embodiment 6

The method as recited in any of embodiments 1-5, wherein, due to the presence of the 'temporary' flag, the namespace does not count against the maximum number of namespaces.

Embodiment 7

The method as recited in any of embodiments 1-6, wherein after the another namespace is deleted, a garbage collection process deletes any remaining namespaces that have been flagged 'deleted.'

Embodiment 8

The method as recited in any of embodiments 1-7, wherein the namespace is a 'sandbox' created in an air-gapped vault.

Embodiment 9

The method as recited in any of embodiments 1-8, wherein the namespace comprises a Btree.

Embodiment 10

The method as recited in any of embodiments 1-8, wherein the namespace is an Mtree that is implemented with a Btree data structure.

Embodiment 11

A system, comprising hardware and/or software, for performing any of the operations, methods, or processes, or any portion of any of these, disclosed herein.

Embodiment 12

A non-transitory storage medium having stored therein instructions that are executable by one or more hardware processors to perform operations comprising the operations of any one or more of embodiments 1-10.

F. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
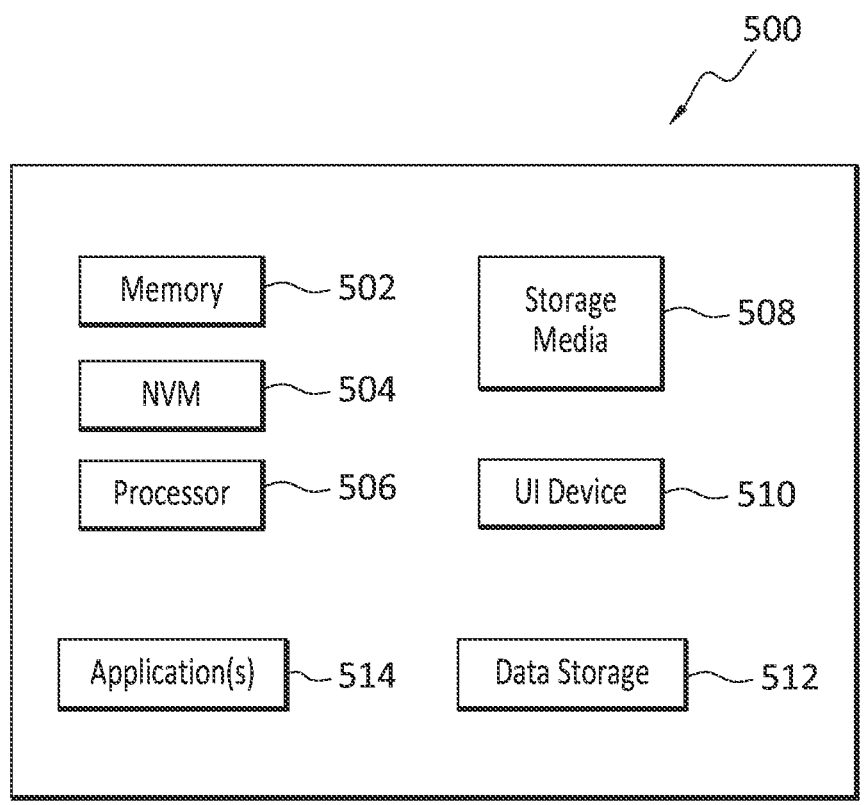
FIG. 5 discloses aspects of an example computing entity operable to perform any of the claimed methods, processes, and operations.

With reference briefly now to FIG. 5, any one or more of the entities disclosed, or implied, by FIGS. 1-4 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI (user interface) device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
creating a namespace for a deduplication filesystem, which uses namespace schemes, in a non-volatile random access memory (NVRAM);
adding, at the time of creation of the namespace, a 'temporary' flag to the namespace indicating the namespace has not been deleted and is planned to be deleted during a regular garbage collection process;
adding a 'delete' flag to the namespace in a case when the namespace is forced to be deleted; and
when a maximum number of namespaces permitted by the deduplication filesystem has been reached due to the creating of the namespace, deleting another namespace bearing a 'temporary' flag from the NVRAM, thereby decrementing a number of namespaces by one,
wherein the namespace, which includes the 'temporary' tag, is not counted against a maximum number of active namespaces stored in the NVRAM.

2. The method as recited in claim 1, wherein the maximum number of namespaces is a function of a size of the NVRAM that stabilizes namespace changes.

3. The method as recited in claim 1, wherein the namespace corresponds to a data protection policy of a customer.

4. The method as recited in claim 1, wherein deleting the another namespace comprises deleting a handle of the another namespace from a U-tree data structure that comprises the another namespace.

5. The method as recited in claim 4, wherein the another namespace is not actually deleted from the deduplication filesystem until the handle has been deleted.

6. The method as recited in claim 1, wherein after the another namespace is deleted, the regular garbage collection process deletes any remaining namespaces that have been flagged 'deleted'.

7. The method as recited in claim 1, wherein the namespace is a 'sandbox' created in an air-gapped vault.

8. The method as recited in claim 1, wherein the namespace comprises a Btree.

9. The method as recited in claim 1, wherein the namespace is an Mtree that is implemented with a Btree data structure.

10. A non-transitory storage medium having stored therein instructions that are executable by one or more hardware processors to perform operations comprising:
creating a namespace for a deduplication filesystem, which uses namespace schemes, in a non-volatile random access memory (NVRAM);
adding, at the time of creation of the namespace, a 'temporary' flag to the namespace indicating the namespace has not been deleted and is planned to be deleted during a regular garbage collection process;
adding a 'delete' flag to the namespace in a case when the namespace is forced to be deleted; and
when a maximum number of namespaces permitted by the deduplication filesystem has been reached due to the creating of the namespace, deleting another namespace bearing a 'temporary' flag from the NVRAM thereby decrementing a number of active namespaces by one,
wherein the namespace, which includes the 'temporary' tag, is not counted against a maximum number of active namespaces stored in the NVRAM.

11. The non-transitory storage medium as recited in claim 10, wherein the maximum number of namespaces is a function of a size of the NVRAM that stabilizes namespace changes.

12. The non-transitory storage medium as recited in claim 10, wherein the namespace corresponds to a data protection policy of a customer.

13. The non-transitory storage medium as recited in claim 10, wherein deleting the another namespace comprises deleting a handle of the another namespace from a U-tree data structure that comprises the another namespace.

14. The non-transitory storage medium as recited in claim 13, wherein the another namespace is not actually deleted from the deduplication filesystem until the handle has been deleted.

15. The non-transitory storage medium as recited in claim 10, wherein after the another namespace is deleted, the regular garbage collection process deletes any remaining namespaces that have been flagged 'deleted'.

16. The non-transitory storage medium as recited in claim 10, wherein the namespace is a 'sandbox' created in an air-gapped vault.

17. The non-transitory storage medium as recited in claim 10, wherein the namespace comprises a Btree.

18. The non-transitory storage medium as recited in claim 10, wherein the namespace is an Mtree that is implemented with a Btree data structure.

* * * * *